Feb. 6, 1962 W. R. WOOTTON 3,020,225
MATERIAL HANDLING PLANT
Filed Feb. 27, 1957 2 Sheets-Sheet 2
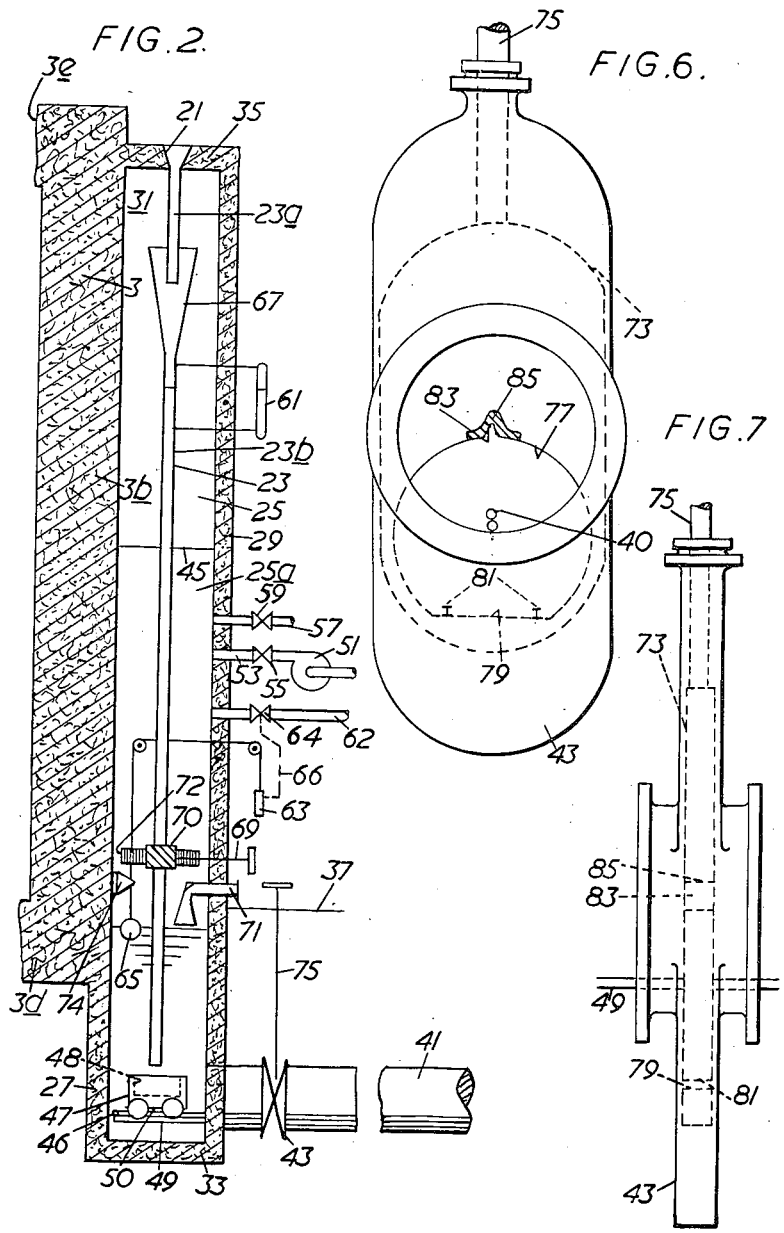
Inventor
William R. Wootton
By
Pennie, Edmonds, Morton, Barrows & Taylor
Attorneys 3,020,225
MATERIAL HANDLING PLANT
William R. Wootton, London, England, assignor to Babcock & Wilcox Limited, London, England, a British company
Filed Feb. 27, 1957, Ser. No. 642,696
Claims priority, application Great Britain Mar. 1, 1956
4 Claims. (Cl. 204—193.2)

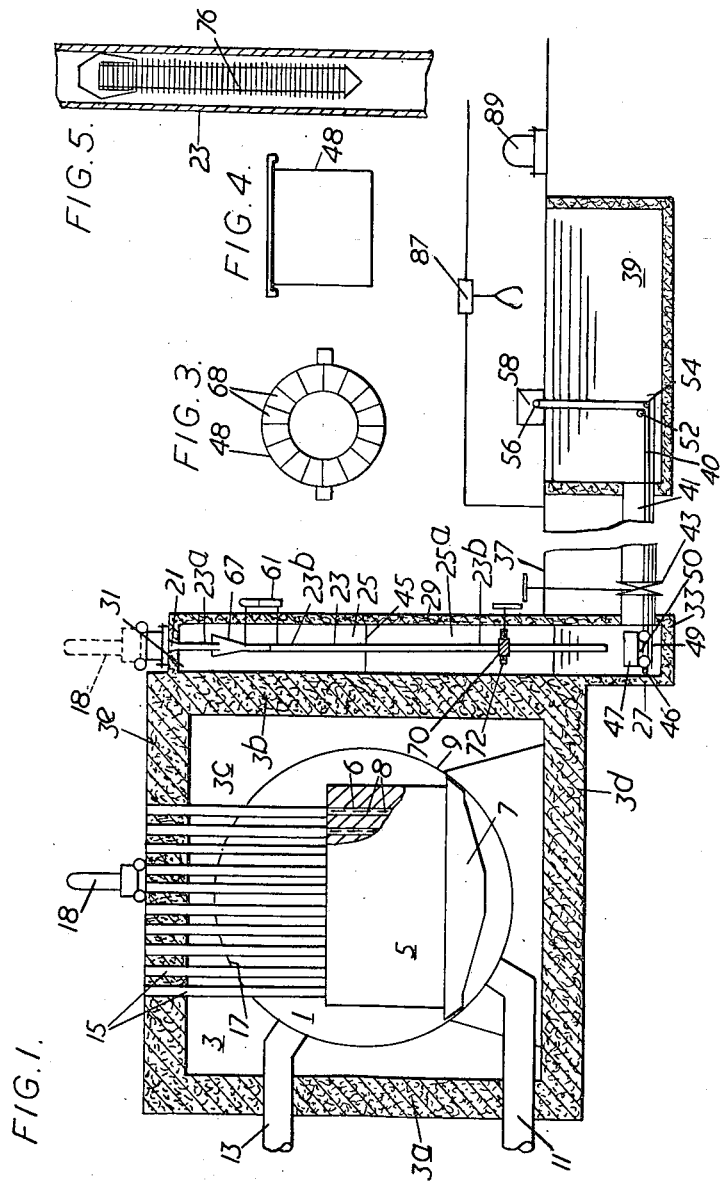

This invention relates to material handling plant and particularly to plant for handling used fuel elements upon removal thereof from a nuclear reactor. In nuclear reactors such as gas-cooled, graphite-moderated reactors, pressurised water reactors and heterogeneous boiling reactors, fuel elements are used each of which includes fissionable material enclosed in a can. From time to time the necessity arises of replacing used fuel elements and to that end the elements to be replaced are withdrawn from the reactor into an unloading machine preparatory to being stored for a period in a pond. During the period of storage the radioactivity of the elements decreases to a suitable degree when the elements may be removed for the recovery of valuable constituents.

During the handling of the used fuel elements, care should be exercised in avoiding damage to the cans, since, in the event of such damage, radioactive fission products are liable to escape and contaminate the working parts of the disposal plant at the reactor site. Hence, in reactors in which the unloading machine is at a substantial distance above the pond, heavy shocks which would result from free acceleration under gravity followed by sudden stoppage are objectionable. It is also desirable that the fuel elements should be stored in an orderly fashion so that individual fuel elements may readily be withdrawn from a group. Advantageously, moreover, fuel elements are unloaded from a reactor, handled and stored in the pond in so orderly a fashion that account may be kept of the location of any particular fuel element. Desirably, fuel elements are immersed substantially throughout their passage from the unloading machine to the pond, but care must be exercised to avoid wetting of any part of the unloading machine.

An object of the present invention is the provision of fuel element handling plant capable of handling radioactive used fuel elements in such a manner that biological protection of personnel is ensured as is a high rate of handling so that the changing of all or part of the charge of fuel elements in a nuclear reactor may be expeditiously effected.

Further objects and advantages of the invention will be apparent from the ensuing description of an embodiment of the invention.

The invention will now be described, by way of example, with reference to the accompanying, largely diagrammatic drawings, in which:

FIGURE 1 is a sectional side elevation through a gas-cooled graphite-moderated nuclear reactor and shows plant for handling used fuel elements upon removal from the reactor;

FIGURE 2 is a view drawn to a larger scale than that of FIGURE 1 and showing in greater detail the handling plant of that figure;

FIGURES 3 and 4 are respective plan and elevation views of a used fuel element receiver of the handling plant of FIGURES 1 and 2 drawn to a larger scale than that used in FIGURE 2;

FIGURE 5 is a fragmentary sectional elevation of a disposal pipe of the handling plant with a used fuel element passing therethrough; and FIGURES 6 and 7 are front and side elevations of a valve associated with the fuel element handling plant.

Referring to FIGURES 1 to 5 of the drawings, a nuclear reactor 1 is contained within a chamber 3 defined by a biological shield comprising concrete front and rear walls 3a and 3b, parallel side walls such as the wall 3c, floor 3d and roof 3e and has a core including a graphite moderator 5 mounted on a support grid 7 within a pressure vessel 9 which is arranged to receive a supply of cooling gas through an inlet conduit 11 for circulation through the core 5 and to discharge circulated gas through an outlet conduit 13. The core 5 includes a large number of vertical channels, such as the channel 6, within which fuel elements 8 are arranged one above the other.

In the reactor shown, spent fuel elements are withdrawn from the moderator from time to time through standpipes 15 which extend vertically from the top of the core 5 through an upper part 17 of the pressure vessel 9 and through the roof 3e of the chamber 3. Disposed in the roof 3e and flush with the upper surface thereof is a system of tracks (not shown) for the guidance of an electrically controlled unloading machine 18 which serves to unload the spent fuel elements and may be moved into location above any selected pipe of the standpipes 15. A traversing bogie 19 mounted on rails (not shown) which extend below the level of and transversely of the tracks formed in the roof 3e, permits the transference of the unloading machine from one of the tracks to another parallel track and its movement to an unloading position above a conically shaped disposal hole 21 which leads to a disposal tube 23, extending vertically within a shaft or chamber 25 which is formed alongside the rear wall 3b of the chamber 3 and is defined by the rear wall 3b and a downwardly extending projection 27 thereof, a wall 29 extending parallel with the wall 3b, parallel side walls such as the wall 31, a floor section 33 and a roof section 35 on which are provided the rails upon which traversing bogie 19 is mounted. The chamber 25 extends downwardly below ground level, which is indicated by the line 37, and, its lower end connects with a reservoir or pond 39 through a pipe 41 which is provided with a gate valve 43 for closing the pipe 41 in a substantially liquid-tight fashion as hereinafter described.

The disposal tube 23 extends vertically downwardly from the disposal hole 21 through a horizontal partition or diaphragm 45 which divides the shaft 25 so as to form a closed space or plenum chamber 25a at its lower end and the tube 23 terminates below the water level obtaining, during operation, at the bottom end of the plenum chamber 25a and a little above a submerged vehicle 47 which is adapted to carry a receiver 48 for spent fuel elements discharged through the tube 23 and is mounted on a track 49 which extends from a station at the lower end of the chamber 25a through the pipe 41 and into the reservoir 39 for the conveyance of the vehicle 47 between the chamber 25a and the reservoir 39. The vehicle 47 is arranged to be propelled by flexible means in the form of a cable 40, which is connected to a bracket 50 on the underside of the vehicle 47 and passes over a pulley 46 within the chamber 25a, pulleys 52 and 54 within the reservoir 39 and thence over pulley 56 disposed above the reservoir and driven through a drive 58. The drive 58 for the cable 40 is located at a convenient position where it may be readily inspected.

With the cable arrangement described, the reservoir 39 may be disposed at a location remote from the reactor 1 and the pipe 41 may be curved to suit the overall lay-out of the nuclear power plant and a plurality of pipes, such as the pipe 41, from respective reactors, in the case of a large central power station, may conveniently be taken to a single reservoir.

Provision is made for creating a superatmospheric pressure in the plenum chamber 25a and to this end a small blower 51 is connected through a pipe 53 and valve 55 to the chamber 25a, whilst for reducing the pressure in the chamber 25a to atmospheric pressure, there is provided a vent pipe 57 which includes a valve 59 and leads to an appropriate filter. By closing the gate valve 43 and the valve 59 in the vent pipe 57 and operating the blower 51 an air pressure is created within the plenum chamber 25a so that the water within the chamber 25a is forced through the bottom of the disposal tube 23 to form a head of liquid within that tube.

Indicating means are provided for showing when a desired head of water within the disposal tube has been achieved and provision is made for automatically maintaining a suitable liquid level in the chamber 25a. Thus, a gauge glass 61 disposed outside the shaft 25 is connected to the disposal tube 23 at positions near the top thereof, and means for supplying water under pressure to the chamber 25a include a pipe 62 provided with a valve 64 which is automatically controlled in dependence upon the water level in the chamber 25a by connecting the valve 64, through linkage means indicated at 66, with a counterweight 63 of a float 65 on the surface of the water in the chamber 25a, the position of the weight 63 thus being inversely related to the liquid level in the chamber 25a.

For inhibiting splashing of water upwardly through the disposal hole 21 upon discharge of a spent fuel element through the tube 23, anti-splash means are provided near the top of the disposal tube and these comprise an enlargement 67 formed after the manner of a funnel with a closed top, an upper part 23a of the disposal tube 23 forming an inlet projecting into the enlargement 67 and terminating above the liquid level, whilst a lower part 23b of the disposal tube 23 co-axial with the part 23a forms an outlet from the enlargement 67.

The unloading machine 18 includes a magazine (not shown) for holding several spent fuel elements, the magazine being so adapted that when the machine 18 is arranged over the disposal hole 21, the spent fuel elements can be discharged one at a time into the disposal hole 21. The receiver 48 carried by the vehicle 47 is formed with peripheral compartments 68 adapted to support respective spent fuel elements in substantially upright positions, the receiver having such a depth that the upper ends of the elements project somewhat above the top of the receiver so that extraction of individual elements from the receiver is facilitated.

The disposal tube 23 is of such a flexible nature that, by guide means in the form of a control rod 69, the lower end of the tube 23 may be moved to different positions above respective compartments of the receiver of the vehicle 47. On the inner end of the control rod 69 there is provided a worm 70 arranged to engage a wormwheel 72 rotatable about a vertical axis through the centre thereof and through which, offset with respect to the centre, passes the disposal tube 23. Thus, by rotation of the control rod 69 there is effected rotation of the worm 70, the wormwheel 72 and, therefore, the tube 23 so that the lower end of the tube 23 moves in a circular path above the compartments 68 of the receiver 48. It will be appreciated that, as an alternative to utilizing the flexibility of the disposal tube 23, the tube 23 could include articulated joints. Moreover, if it were desirable to maintain the tube 23 in a fixed position, suitable means could be provided for exactly positioning the receiver in relation to the disposal tube.

The receiver associated with the vehicle 47 and the lower end of the disposal tube 23 are brightly illuminated by means of a searchlight 74, and a periscope 71 is provided in the neighbourhood of the control rod 69 for observing the position of the lower end of the disposal tube relative to the receiver in the vehicle 47.

The diameter of the disposal tube 23 is so chosen that a dash-pot action is exerted in relation to a fuel element falling therethrough. Thus, in the case of a finned fuel element, such as element 76 in FIGURE 5, having overall dimensions of the order of 2′ in length and 4″ in diameter, the disposal tube would have a diameter of perhaps 4¼″ which would be sufficient to ensure the free passage of the fuel element notwithstanding slight bowing which the element may have suffered during service in the nuclear reactor. Accordingly, during descent of the fuel element through the disposal tube 23, the water in the disposal tube is forced to flow relatively to the element in the annular space between the element and the tube and encounters resistance due to turbulence in the vicinity of the fins.

It will be understood, therefore, that when a fuel element is passed from the unloading machine 18 through the disposal hole 21 and the inlet tube 23a it meets a level of water in the disposal tube, at which time splashing upwardly through the disposal hole 21 is prevented by the anti-splash enlargement 67. The downward movement of the fuel element through the disposal tube 23 is then strongly damped by the dash-pot action so that the fuel element is discharged from the bottom of the disposal tube 23 and into a selected compartment of the receiver 48 carried by the vehicle 47 at a moderate and safe velocity.

Whilst the receiver 48 on the vehicle 47 is being loaded with spent fuel elements discharged through the disposal tube 23, the gate valve 43 is kept closed, whilst for the conveyance of the vehicle 47 between its station below the disposal tube 23 and the reservoir 39, valve 43 is opened. Suitably, as shown in FIGURES 6 and 7, a gate 73 can be raised or lowered by means of an operating shaft 75 and is shown in the half-raised position and includes an aperture 77 which in the raised position of the gate 73 is adapted to register with the pipe 41. Mounted on the gate 73 and extending throught the aperture 77 on a lower surface 79 thereof are rail sections 81 which in the raised position of the gate 73, i.e. the open position of the valve 43, provide continuity of the track 49 on which the vehicle 47 is mounted.

At the upper side of the aperture 77 there is provided a groove 83 provided with a rubber cushion 85 which, in the closed position of the valve 43, engages the cable 40 so as to provide substantial liquid-tight closure of the valve 43.

For lifting a loaded receiver 48 from the vehicle 47 and for placing the receiver at a suitable storage location in the reservoir 39 and for placing upon the vehicle 47 an empty receiver for transport to its station below the disposal tube 23, there is provided, as shown in FIGURE 1, above the reservoir 39 a gantry hoist 87 which is also available for lifting receivers, after they have remained in the reservoir 39 for a period sufficient to effect appropriate decay of radioactivity of the fuel elements, onto a transport wagon 89 for conveyance of used fuel elements away from the reservoir 39.

In the operation of the plant, the chamber 25a below the diaphragm 45 being at atmospheric pressure, the gate valve 43 is opened and vehicle 47 loaded with an empty receiver is moved from the reservoir 39 through the pipe 41 to its station below the disposal tube 23, whereupon the gate valve 43 is reclosed. The valve 59 in the air vent pipe 57 is closed and the valve 55 in the blower pipe 53 is opened. The blower 51 is then operated to create a superatmospheric pressure above the water level in the chamber 25a until the gauge glass 61 shows that the desired head of liquid has been attained. The pressure exerted by the blower is then controlled through adjustment of the valve 55 to maintain the said head. Any leakage past the gate valve 43 is automatically made up through operation of the valve 64 in the water supply pipe 62 in dependence upon the position of the counterweight 63 which position is determined by the liquid level in the chamber 25a.

The fuel element unloading machine 18 being properly positioned in relation to the disposal hole 21, the elements are released one at a time and deposited in respective compartments of the receiver of the vehicle 47 by properly positioning the lower end of the disposal tube 23 in relation to the receiver before the discharges of the elements.

When the receiver has been filled, operation of the blower 51 is discontinued, the valve 55 is closed and the valve 59 in the vent pipe 57 is opened. After atmospheric pressure has been reestablished in the chamber 25a, the gate valve 43 is reopened and the vehicle is withdrawn from the chamber and removed to its position in the reservoir.

By utilisation of the pressure to maintain a head of liquid in the disposal tube the necessity of selectionalising the tubes by means of valves opened in sequence to permit the passage of a fuel element downwardly through the disposal tube and the delay caused by the operation of the valves and the making up of the considerable amount of liquid discharged from the tube during the passage of each fuel element are avoided.

What is claimed is:

1. Plant for conveying from an upper level used fuel elements withdrawn from a nuclear reactor and released at said upper level to a movable fuel-element receiver at a lower level and adapted for the reception of a plurality of fuel elements at respective locations therein, comprising a fluid-tight chamber adapted to receive in its lower portion the movable fuel-element receiver, a generally vertically-extending disposal tube positioned in said chamber and having an opening at its upper portion to receive a used fuel element withdrawn from the nuclear reactor and released at said upper level and which is adapted to guide the descent of the used fuel element under gravity and to discharge said used fuel element from its lower end at said lower level to the fuel-element receiver, means for maintaining a body of liquid in the lower portion of said chamber with the upper surface thereof above the level of the bottom of the disposal tube, a blower having its discharge outlet communicating with the chamber to discharge air into the chamber at superatmospheric pressure to pressurize the chamber to force liquid from said body upwardly in the disposal tube to a level higher than the normal level of the body of liquid when the chamber is at atmospheric pressure to brake the descent of a used fuel element passing downwardly through said disposal tube, and means to shift the discharge end of the disposal tube to different positions, whereby the lower end of the disposal tube may be positioned to discharge used fuel elements passing therethrough into different locations in the fuel-element receiver.

2. A plant as claimed in claim 1 which includes anti-splash means for inhibiting splashing of liquid upwardly through the top of said disposal tube, said anti-splash means comprising a splash-receiving enlargement in the upper portion of the disposal tube, the portion of the disposal tube from its opening extending downwardly into and terminating within the enlargement and being coaxial with the portion of the disposal tube below the enlargement.

3. In combination, a nuclear reactor comprising an assembly adapted to receive fuel elements, each of which includes a can containing fissionable material, fuel-element discharging means for withdrawing of irradiated fuel elements from said assembly and for releasing said irradiated fuel elements at an upper level to be moved to a lower level for reception into a fuel-element receiver, comprising a fluid-tight chamber adapted to receive in its lower portion the movable fuel-element receiver, a generally vertically-extending disposal tube positioned in said chamber and having an opening at its upper portion to receive irradiated fuel elements withdrawn from the nuclear reactor and released at said upper level, said disposal tube being adapted to guide the descent of irradiated fuel elements under gravity and to discharge said irradiated fuel elements from its lower end at said lower level to the fuel-element receiver, means for maintaining a body of liquid in the lower portion of said chamber with the upper surface thereof above the level of the bottom of the disposal tube, means for pressurizing the chamber to superatmospheric pressure to force liquid from said liquid body upwardly in the disposal tube to a level higher than the normal level of the body of liquid when the chamber is at atmospheric pressure to brake the descent of irradiated fuel elements passing downwardly through said disposal tube, an aging pond for the storage of withdrawn irradiated fuel elements, the surface of which is at atmospheric pressure, a passageway connecting said aging pond with the lower portion of said chamber, valve means for closing said passageway, and means for transferring a fuel-element receiver between the lower portion of said chamber and said pond when said valve means is in open position, below the level of liquid in said chamber and the level of the liquid in said pond.

4. The combination claimed in claim 3 wherein the fuel-element receiver is adapted for the reception of a plurality of fuel elements at respective locations in said receiver and the lower end of the disposal tube is mounted for movement over said locations, and which includes means for shifting the lower end of the disposal tube to different positions, whereby the lower end of the disposal tubes may discharge fuel elements passing therethrough into different locations in the receiver.

References Cited in the file of this patent

UNITED STATES PATENTS

| | | |
|---|---|---|
| 1,145,215 | Roney | July 6, 1915 |
| 1,413,505 | Stump | Apr. 18, 1922 |
| 2,657,782 | Gerber | Nov. 3, 1953 |
| 2,756,859 | Steffen et al. | July 31, 1956 |
| 2,803,601 | Cooper | Aug. 20, 1957 |

OTHER REFERENCES

AECD–3731, Oct. 14, 1955, page 91, Technical Information Extension, Oak Ridge, Tenn. 204/154.26.

Nucleonics, vol. 14, No. 11, November 1956, pp. 138–144.

Westinghouse Engineers, September 1956, pp. 138–142.